United States Patent [19]

Pimiskern et al.

[11] 4,220,379
[45] Sep. 2, 1980

[54] SPIRAL GROOVED SPHERICAL BEARING

[75] Inventors: Klaus Pimiskern, Daisendorf; Werner Herbert, Markdorf, both of Fed. Rep. of Germany

[73] Assignee: Dornier System GmbH, Fed. Rep. of Germany

[21] Appl. No.: 21,099

[22] Filed: Mar. 16, 1979

[30] Foreign Application Priority Data

Apr. 7, 1978 [DE] Fed. Rep. of Germany ....... 2815009

[51] Int. Cl.² .............................................. F16C 17/10
[52] U.S. Cl. ......................................... 308/36; 308/9; 308/172; 308/236
[58] Field of Search ................. 308/36 R, 9, 236, 172, 308/170, 230, 139 R

[56] References Cited

U.S. PATENT DOCUMENTS

| | | | |
|---|---|---|---|
| 2,216,726 | 10/1940 | Andersen | 308/230 |
| 3,874,749 | 4/1975 | Maniak | 308/9 |
| 3,883,193 | 5/1975 | Hepp et al. | 308/9 |

Primary Examiner—Lenard A. Footland
Attorney, Agent, or Firm—James E. Bryan

[57] ABSTRACT

This invention relates to an improvement in a spiral grooved bearing for a shaft adapted to travel in the direction of rotation, composed of a stationary bearing part with a hemispherically cup-shaped first sliding surface and a bearing part of the shaft having a spherical second sliding surface with spiral grooves in said second surface adapted to feed a lubricant between said sliding surfaces, the improvement comprising an additional bearing part centered at the hemispherically-shaped bearing part, said additional part having a sliding surface which encloses said second sliding surface up to the vicinity of said shaft, and sleeve means adapted to receive said stationary bearing part and said additional part.

2 Claims, 7 Drawing Figures

SPIRAL GROOVED SPHERICAL BEARING

The present invention relates to a spiral grooved spherical bearing for a shaft traveling in the direction of rotation, composed of a stationary bearing part having a hemispherically cup-shaped sliding surface and a bearing part of the shaft with a spherical sliding surface with spiral grooves therein, which feed a lubricant between the sliding surfaces.

Figure 5:
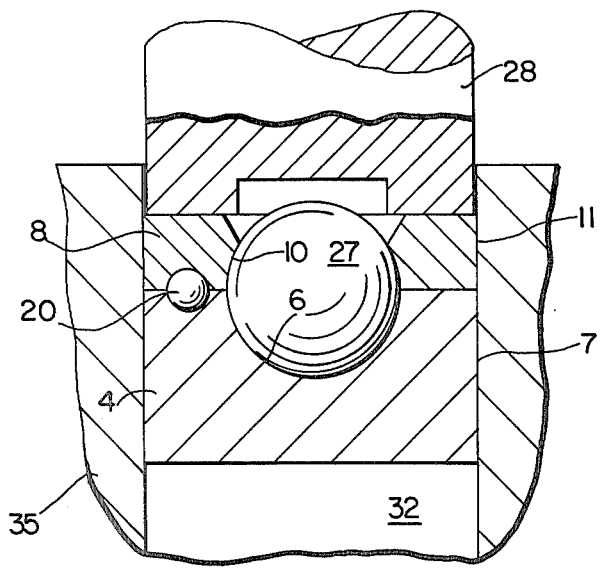

A spiral grooved spherical bearing of this type is known from German Patent No. 1,235,680. The bearing in this patent absorbs essentially axial forces while it is capable of transmitting radial forces to a limited extent, maximally up to the amount of the axial force. In high-speed machines it is necessary, because of arising imbalances, to achieve, at a low power loss, as high as possible a radial load so that measures are required for improving the ratio of radial load/axial load. This may be done, for example, in that the basic pattern on the ball or sphere of one bearing part assumes a looping angle of more than 180°, and in that the hemispherically-shaped sliding surface of the ball cup or socket is fully utilized. In FIG. 5 of German Patent No. 1,235,680, it is indicated that adjoining a hemispherical bearing part there may be a cylindrical bearing part which could be paired with sleeve or bushing part. While the radial load carrying capacity of the bearing could be improved thereby, the bearing itself could no longer withstand any nutation movements and tilting positions of the shaft.

It is the object of the present invention to provide a spiral grooved spherical bearing with which high radial loads can be absorbed.

This object is obtained, in accordance with the present invention, in that centered at the hemispherical bearing part is another bearing part with a spherical segment-shaped sliding surface, which surrounds the spherical sliding surface equipped with spiral grooves into the vicinity of the shaft, and in that both bearing parts are set into a sleeve. It is advantageous, according to the present invention, that one ball or sphere center the two stationary bearing parts.

With the inventive construction of the bearing, the ratio of radial load/axial load may assume high values, and in a special case, no axial load is required for the operation of the spiral grooved spherical bearing, or an operation thereof is possible also in case of an axial removal of the load.

Particular difficulties arise in connection with the proper series manufacture of the cup or spherical segment composed of two bearing half shells, because the effective lubricating gaps in the spiral grooved bearing amount to only 1-2 $\mu$m and because a high degree of accuracy is required specifically at the joint.

It is therefore a particular object of the present invention to provide a manufacturing process for spiral grooved spherical bearings which assures that the two ball cup-shaped bearing parts have within the area of their joint only one ledge which is smaller than the effective lubricating gap. This requires a manufacturing process which guarantees a precise centering between the two bearing parts, which is not achieved with the heretofore customary means.

This main object of the present invention is obtained by the following process steps, Initially a sliding surface is impressed in known manner into the hemispherically cup-shaped bearing part by means of a ball or sphere, whereupon the other bearing part which will later constitute the upper bearing part is impressed with a ball, both bearing parts composed of copper-beryllium are plated with a hardenable nickel alloy, impressed into the equatorial wall of the first bearing part is a ball having a small diameter, both bearing parts are jointly calibrated in one tool and positioned, and both bearing parts together with the rotating bearing part with the spherical sliding surface are pressed into a sleeve or bushing having a conical jacket.

Figure 1:
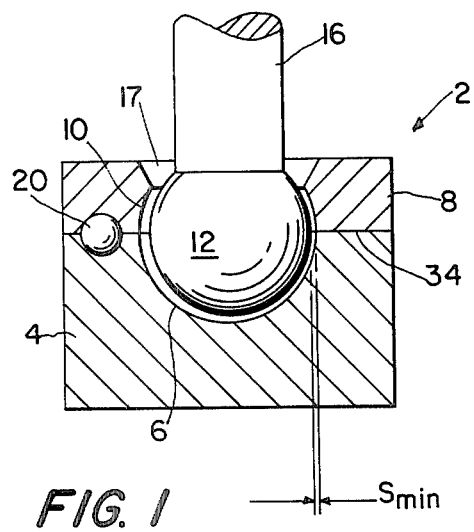
Figure 2:
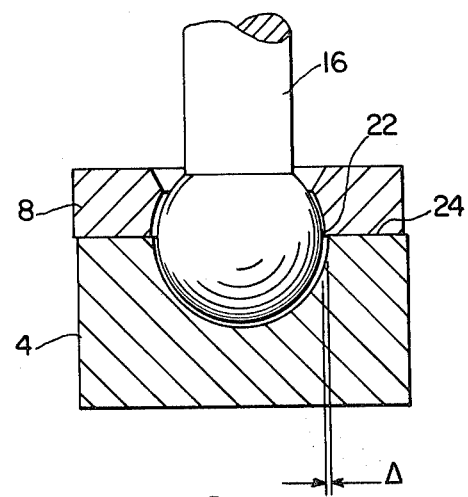
Figure 3:
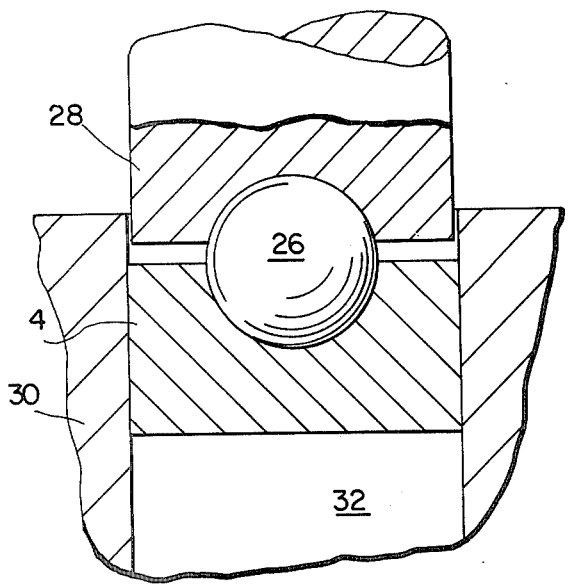

Further advantages, features, and possibilities for the use of the present invention are apparent from the accompanying drawings which will be further described hereinafter, and wherein FIG. 1 is a cross-sectional view through an inventive spiral grooved spherical bearing;

FIG. 2 is a basic sketch regarding the principal difficulties in the manufacture of the spiral grooved spherical bearing, and FIGS. 3 to 7 illustrate process steps during the manufacture of the inventive spiral grooved spherical bearing.

Figure 7:
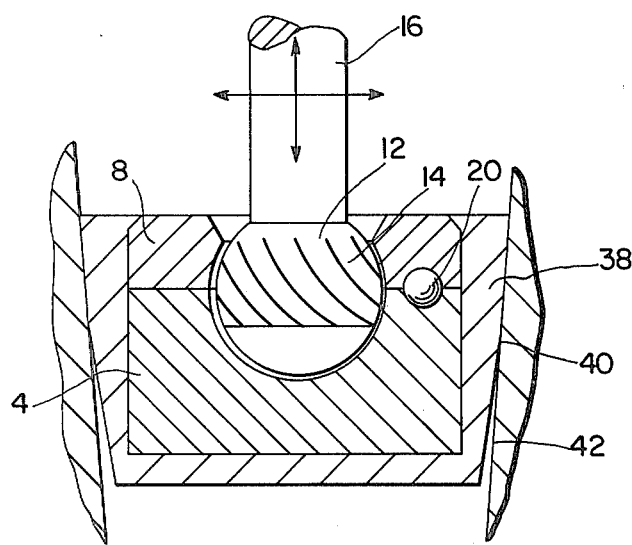

FIG. 1 is a cross-sectional view of a spiral grooved spherical bearing 2 which is composed of a bearing part 4 with a ball cup-shaped sliding surface 6 as the lower bearing part and of an upper bearing part 8 also having a ball cup-shaped sliding surface 10. Accommodated within the bearing is a ball or sphere 12 which is provided at the surface thereof with spiral grooves 14 (FIG. 7). Welded by means of electron beam welding to the ball or sphere 12 is a shaft 16 which penetrates through the upper bearing part 8 via a bore 17. Between the lower bearing part 4 and the upper bearing part 8 is a ball or sphere 20 for the purpose of centering the two bearing parts.

As in apparent from FIG. 2, the particular problem in connection with the subject matter of the present invention resides in so centering the bearing part 4 and the bearing part 8 with respect to each other that the ledge or section 22 at the joint 24 becomes as small as possible. It must in any case be considerably smaller than the effective lubricating gap which amounts to approximately 1–2 $\mu$m in spiral grooved bearings. If the ledge or section 22 is greater or larger than that, the lubricating gap no longer has a uniform size and the result may be abrasion as well as wear and tear; quite apart therefrom, the radial supporting capacity of the bearing is significantly reduced thereby.

For the purpose of obtaining an optical lubricating gap, the following process steps are employed in the manufacture of the inventive spiral grooved spherical bearing:

Initially, the lower cup or spherical part 4 is rough-pressed in known manner (FIG. 3), whereby a ball 26 which may be an antifriction bearing ball or a spherically-ground pin is impressed by means of a stamp 28 into the lower cup or spherical part 4. The imprinting process takes place in a sleeve or bushing 30 and a counter support 32 is employed therefor.

Figure 4:
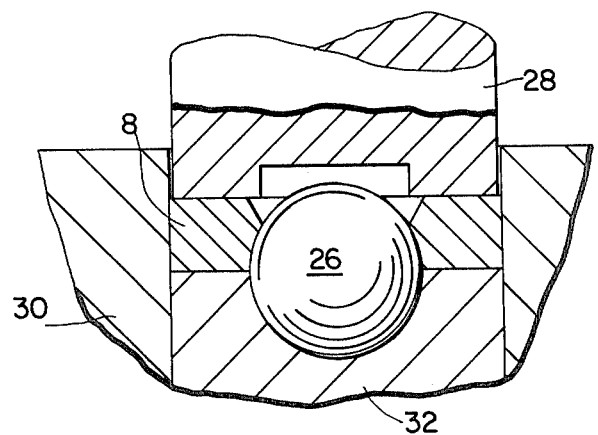

In the same manner and as illustrated in FIG. 4, the upper cup or spherical part 8 which already is provided with the bore 17 is impressed or stamped with a ball 26.

Figure 6:
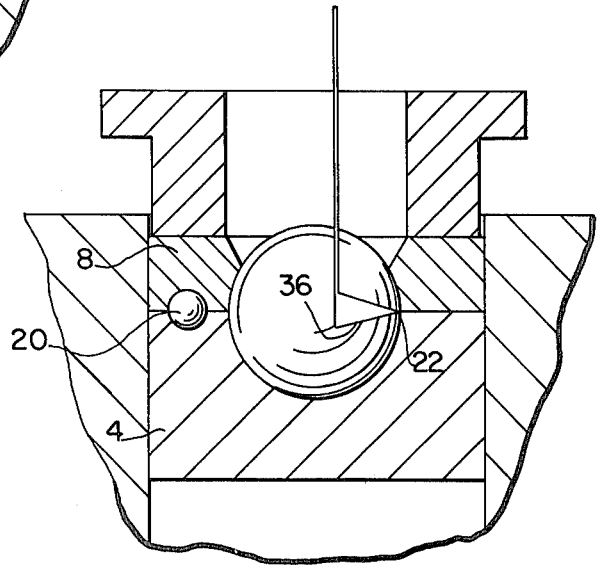

Then, the upper and the lower cup or spherical parts are coated with a hardenable nickel alloy layer. After the lower cup or spherical part 4 has been coated, the ball 20 having a diameter of approximately 1 mm is pressed into the surface 34 (FIG. 1). Then the upper and the lower cup or spherical parts are jointly calibrated in one tool 35 (FIG. 5) and settled in position. Then measurement of the upper and of the lower cup or spherical parts is effected with a measuring instrument which is known under the name of "Rotary Talysurf". The measuring operation is illustrated in FIG. 6, wherein a measuring key or calipers 36 measures the ledge or section 22 between the lower cup part 4 and the upper cup part 8. Individually measured are the transition between the upper cup part and the lower cup part, the diameter at the equator, and the concentricity at the equator.

Concomitantly with the working steps described above, a cup or spherical sleeve or bushing 38 which is shown in FIG. 7 is pressed on. This sleeve or bushing 38 is also coated with a hardenable nickel alloy layer. Together with a traveling needle 12, 16 the upper and the lower spherical parts are pressed into the sleeve or bushing 38 and wedged in place, and subsequently the bearing play or clearance may be measured with the aid of the traveling needle.

FIG. 7 also illustrates an example for the assembly of a complete spiral grooved spherical bearing. The sleeve or bushing 38 is conically formed at its jacket 40 and may thus be easily fitted into a receiving part 42 provided with a conical jacket, whereby the fastening at axial load in one direction takes place merely by way of the tapered socket, and no specific threaded parts are required.

The particularity in the manufacturing process according to the present invention will now be described once again hereinafter:

The lower bearing part 4 and the upper bearing part 8 are jointly calibrated in one tool 35 (FIG. 5) together with a ball 27. Established as a result thereof is a relationship between the two cups or spherical segments 6 and 10 and the two generated surfaces or shells 7 and 11. This relationship (continuous generatrix or surface line 7 and 11) is present only if the position between the lower cup or spherical part 4 and the upper part or spherical part 8 with respect to each other is secured so as to be rigid against torsion. This is achieved by means of the ball 20.

It will be obvious to those skilled in the art that many modifications may be made within the scope of the present invention without departing from the spirt thereof, and the invention includes all such modifications.

What is claimed is:

1. In a spiral grooved bearing for a shaft adapted to travel in the direction of rotation, composed of a stationary bearing part with a hemispherically cup-shaped first sliding surface and a bearing part of the shaft having a spherical second sliding surface with spiral grooves in said second surface adapted to feed a lubricant between said sliding surfaces, the improvement comprising an additional bearing part centered at the hemispherically-shaped bearing part, said additional part having a sliding surface which encloses said second sliding surface up to the vicinity of said shaft, and sleeve means adapted to receive said stationary bearing part and said additional part.

2. A bearing according to claim 1 including ball means for centering said stationary bearing part and said additional part.

* * * * *